US008487906B2

(12) United States Patent
Chen et al.

(10) Patent No.: US 8,487,906 B2
(45) Date of Patent: Jul. 16, 2013

(54) METHOD FOR DETECTING A TOUCHED POSITION ON A TOUCH DEVICE

(75) Inventors: Po-Yang Chen, Miao-Li County (TW); Po-Sheng Shih, Miao-Li County (TW)

(73) Assignee: Chimel Innolux Corporation, Chu-Nan (TW)

( * ) Notice: Subject to any disclaimer, the term of this patent is extended or adjusted under 35 U.S.C. 154(b) by 381 days.

(21) Appl. No.: 12/813,095

(22) Filed: Jun. 10, 2010

(65) Prior Publication Data

US 2011/0007010 A1     Jan. 13, 2011

(51) Int. Cl.
*G06F 3/045* (2006.01)

(52) U.S. Cl.
USPC .......................................... 345/174; 345/173

(58) Field of Classification Search
None
See application file for complete search history.

(56) References Cited

U.S. PATENT DOCUMENTS

| 4,752,655 | A | * | 6/1988 | Tajiri et al. ..................... 345/174 |
| 7,250,940 | B2 | * | 7/2007 | Jayanetti et al. ............... 345/173 |
| 2005/0110767 | A1 | * | 5/2005 | Gomes et al. .................. 345/173 |
| 2005/0209392 | A1 | | 9/2005 | Luo et al. |
| 2009/0160798 | A1 | * | 6/2009 | Jiang et al. ..................... 345/173 |

* cited by examiner

*Primary Examiner* — Sumati Lefkowitz
*Assistant Examiner* — Joseph Fox
(74) *Attorney, Agent, or Firm* — WPAT, PC; Justin King

(57) ABSTRACT

A method for detecting a touched position on a touch device including a first conductive layer and sensing electrodes disposed on one side of the first conductive layer and separated from each other is disclosed. The method includes providing a first voltage to the first conductive layer; receiving a touch signal in response to a touched position of the touch device to change the first voltage at an area of the first conductive layer; measuring the sensing electrodes detecting the variation of the first voltage to obtain voltage signals; obtaining a first sensing position according to the voltage signals and a position computing mode; obtaining a second sensing position according to the first sensing position and a correction mode. The area corresponds to the touched position, the second sensing position is equal to the touched position, and the correction mode has a first curve relation.

20 Claims, 5 Drawing Sheets

METHOD FOR DETECTING A TOUCHED POSITION ON A TOUCH DEVICE

BACKGROUND

1. Technical Field

The present disclosure relates to a method for detecting a touched position on a touch device, and more particularly, the present disclosure relates to a method for detecting a touched position on a resistive touch device.

2. Description of Related Art

FIG. 1 is a schematic cross-sectional view of a resistive touch panel.

Referring to FIG. 1, the touch panel 10 includes a first conductive layer 12, a second conductive layer 14 and a plurality of spacers 16. The spacers 16 are located between the first conductive layer 12 and the second conductive layer 14, so that the first conductive layer 12 and the second conductive layer 14 are separated from each other to avoid short circuiting and generate the unnecessary mistake action without touching. The first conductive layer 12 and the second conductive layer 14 are respectively responsible for detecting the positions of the touched place in different directions. For example, the first conductive layer 12 is responsible for detecting X-direction position, and the second conductive layer 14 is responsible for detecting Y-direction position.

In operation, the first conductive layer 12 and the second conductive layer 14 are exerted a difference voltage, respectively. When the user touches the touch panel 10, the area of the first conductive layer 12 corresponding to the touched place and the area of the second conductive layer 14 corresponding to the touched place are connected to each other, so that the first conductive layer 12 and the second conductive layer 14 generate voltage variation. Hence, the X-direction position of the touched place can be obtained by detecting the voltage change of the first conductive layer 12. The Y-direction position of the touched place can be obtained by detecting the voltage change of the second conductive layer 14.

In a condition, the position of the touched place detected by the touch panel 10 should be equal to the real position of the touched place. However, under the influence of the spaces between the conductive circuits of the first conductive layer 12, the spaces between the conductive circuits of the second conductive layer 14, and the data processing method used in technique, the errors occur and cause the detected position of the touched place different form the real position of the touched place.

SUMMARY

A embodiment of the present disclosure discloses a method for detecting a touched position on a touch device. The touch device has a first conductive layer and a plurality of sensing electrodes disposed on one side of the first conductive layer. The sensing electrodes are separated from each other. The method for detecting the touched position includes the following steps. A first voltage is provided to the first conductive layer. The first voltage is changed at one area of the first conductive layer by receiving a touch signal in response to a touched position of the touch device. The area corresponds to the touched position. A plurality of voltage signals is obtained by measuring the sensing electrodes detecting the variation of the first voltage. A first sensing position is obtained according to the voltage signals and a position computing mode. A second sensing position is obtained according to the first sensing position and a correction mode. The second sensing position is equal to the touched position, and the correction mode has a first curve relation.

Another embodiment of the disclosure discloses a method for detecting a touched position on a touch device. The touch device has a first conductive layer and a plurality of sensing electrodes disposed on a first side of the first conductive layer. The sensing electrodes are separated from each other. The method for detecting the touched position includes the following steps. A first voltage is provided to the first conductive layer. The first voltage is changed at a area of the first conductive layer by receiving a touch signal in response to a touched position of the touch device. The area corresponds to the touched position. A plurality of voltage signals is obtained by measuring the sensing electrodes detecting the variation of the first voltage. The voltage signal includes a extreme value voltage signal, a first voltage signal, and a second voltage signal. The sensing electrodes includes a first sensing electrode, a second sensing electrode, and a third sensing electrode. The first voltage signal is obtained from the first sensing electrode. The extreme value voltage signal is obtained from the second sensing electrode. The second voltage signal is obtained from the third sensing electrode. The second sensing electrode is located between the first sensing electrode and the third sensing electrode, and the second sensing electrode is disposed adjacent to the first sensing electrode and the third sensing electrode, respectively. A corrected voltage signal is obtained by adjusting the second voltage signal according to a voltage adjusting mode. A first sensing position is obtained according to the first voltage signals, the extreme value voltage signal, the corrected voltage signal and a position computing mode. A second sensing position is obtained according to the first sensing position and a correction mode. The second sensing position is equal to the touched position, and the correction mode has a first curve relation.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
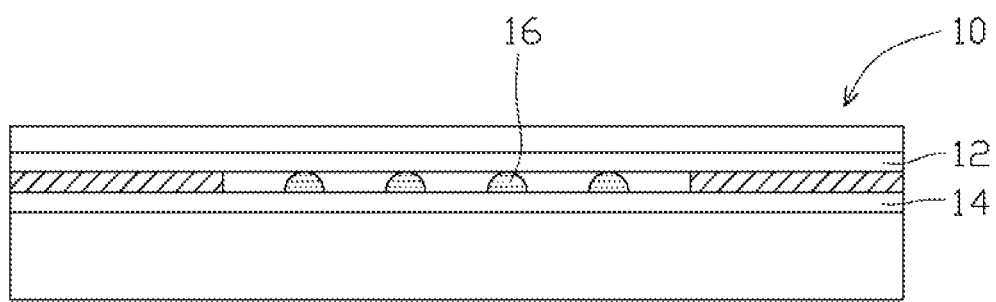
FIG. 1 is a schematic cross-sectional view of a resistive touch panel.
Figure 2:
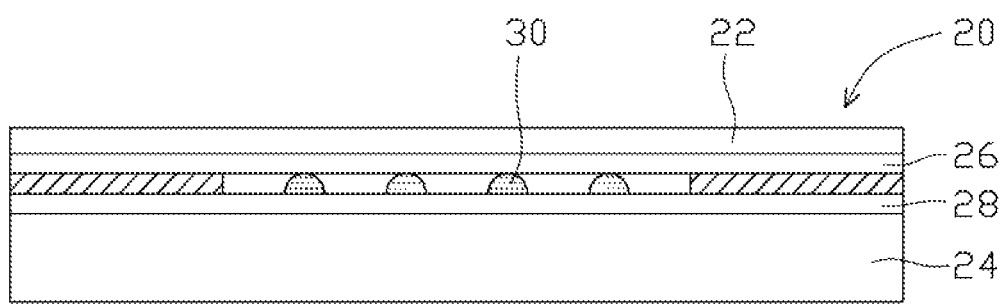
FIG. 2 is a schematic cross-sectional view of a touch device according to one embodiment of the present disclosure.

FIG. 2 is a schematic cross-sectional view of a touch device according to one embodiment of the present disclosure. Referring to FIG. 2, the touch device 20 includes a first substrate 22, a second substrate 24 opposite to the first substrate 22, a first conductive layer 26, a second conductive layer 28, and a plurality of spacers 30. The first substrate 22 can be a polyester film and the second substrate 24 can be a glass substrate. The first conductive layer 26 is disposed on a surface of the first substrate 22 faced to the second substrate 24. The second conductive layer 28 is disposed on a surface of the second substrate 24 faced to the first substrate 22. The second conductive layer 28 and the first conductive layer 26 are stacked together. The spacers 30 are disposed between the first conductive layer 26 and the second conductive layer 28 and has the functions of the insulation and supporting, so that the first conductive layer 26 is electrically isolated with the second conductive layer 28 when touch device 20 is not pressed.

Figure 3:
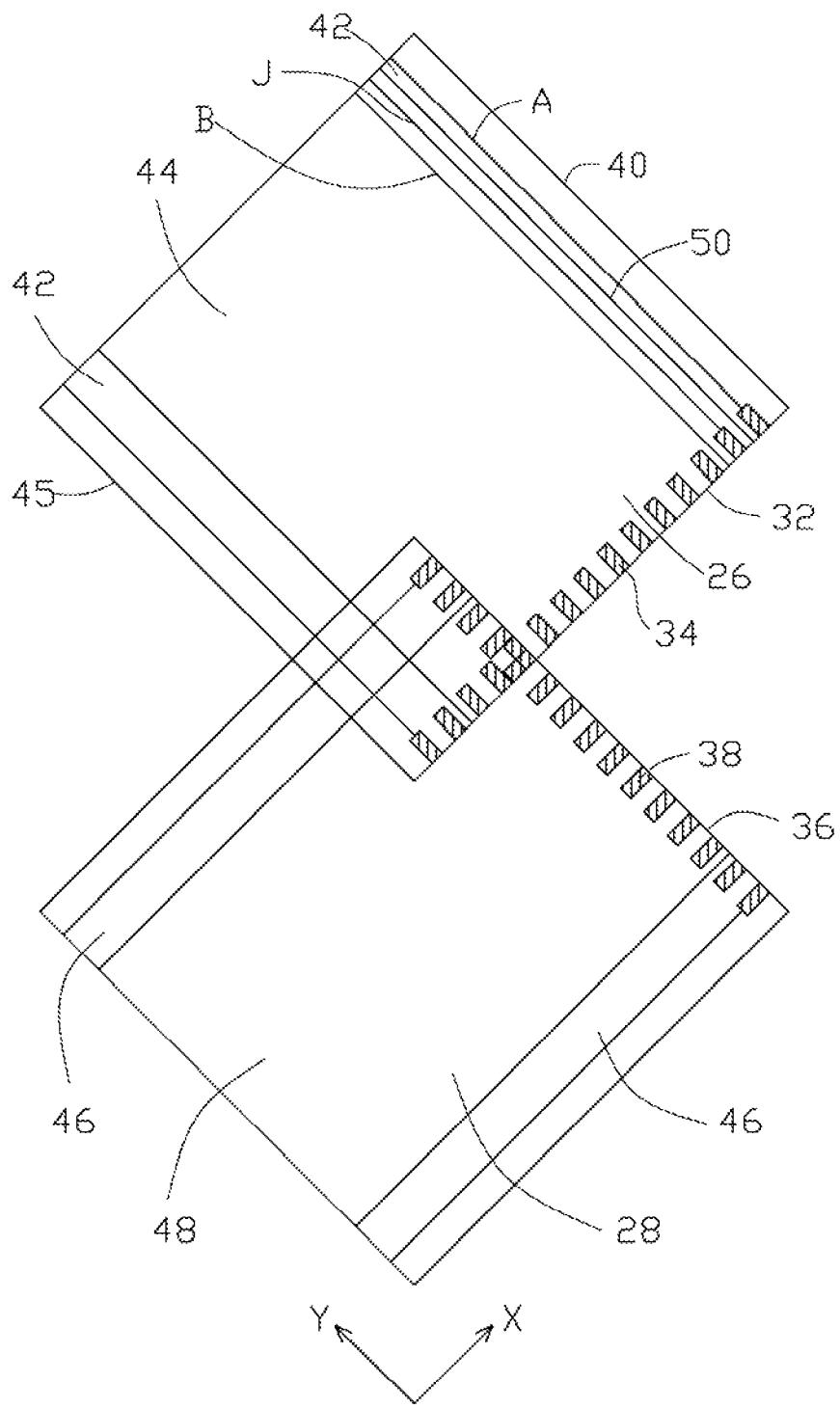
FIG. 3 is a schematic view illustrating relative positions of a first conductive layer and a second conductive layer of the touch device in FIG. 2.

FIG. 3 is a schematic view illustrating relative positions of a first conductive layer and a second conductive layer of the touch device in FIG. 2. Referring to FIG. 3, the touch device 20 further has a plurality of sensing electrodes 34 disposed on a first side 32 of the first conductive layer 26 and separated from each other, and a plurality of sensing electrodes 38 disposed on a side 36 of the second conductive layer 28 and separated from each other. The side 36 of the second conductive layer 28 on which the sensing electrode 38 is disposed is close to a second side 40 perpendicular to the first side 32 of the first conductive layer 26. The first conductive layer 26 has impedance anisotropic properties. For example, the first conductive layer 26 can be a carbon nanotube film and the conductive direction of the first conductive layer 26 is substantially parallel to the Y-direction. The second conductive layer 28 has impedance anisotropic properties. For example, the second conductive layer 28 can be a carbon nanotube film and the conductive direction of the second conductive layer 28 is substantially parallel to the X-direction. In addition, the first conductive layer 26 has two boundary regions 42 and a non-boundary region 44. The boundary region 42 at the upper right side of the first conductive layer 26 in the FIG. 3 is located between a first line A and a second line B. The first line A extends from one of the sensing electrodes 34 closest to the second side 40 (e.g. the first sensing electrode counted from the second side 40) and is parallel to the second side 40. The second line B extends from the center between the two adjacent sensing electrodes 34 adjacent to the one of the sensing electrodes 34 closest to the second side 40 (e.g. a center between the second sensing electrode and the third sensing electrode counted from the second side 40) and is parallel to the second side 40. Another boundary region 42 at the lower left side of the first conductive layer 26 is opposite to the boundary region 42 at the upper right side. The boundary region 42 at the lower left side of the first conductive layer 26 is located between two straight lines and the two straight lines respectively extend from the first sensing electrode counted form a third side 45 of the first conductive layer 26 and from the center between the second sensing electrode and the third sensing electrode counted from the third side 45. The two straight lines are parallel to the third side 45, and the third side 45 is opposite to the second side 40. The non-boundary region 44 is located between the two boundary regions 42. Similarly, the second conductive layer 28 also has two boundary regions 46 and a non-boundary region 48. The two boundary regions 46 are respectively located in the lower right side and the upper left side of the second conductive layer 28 as shown in FIG. 3.

Figure 4:
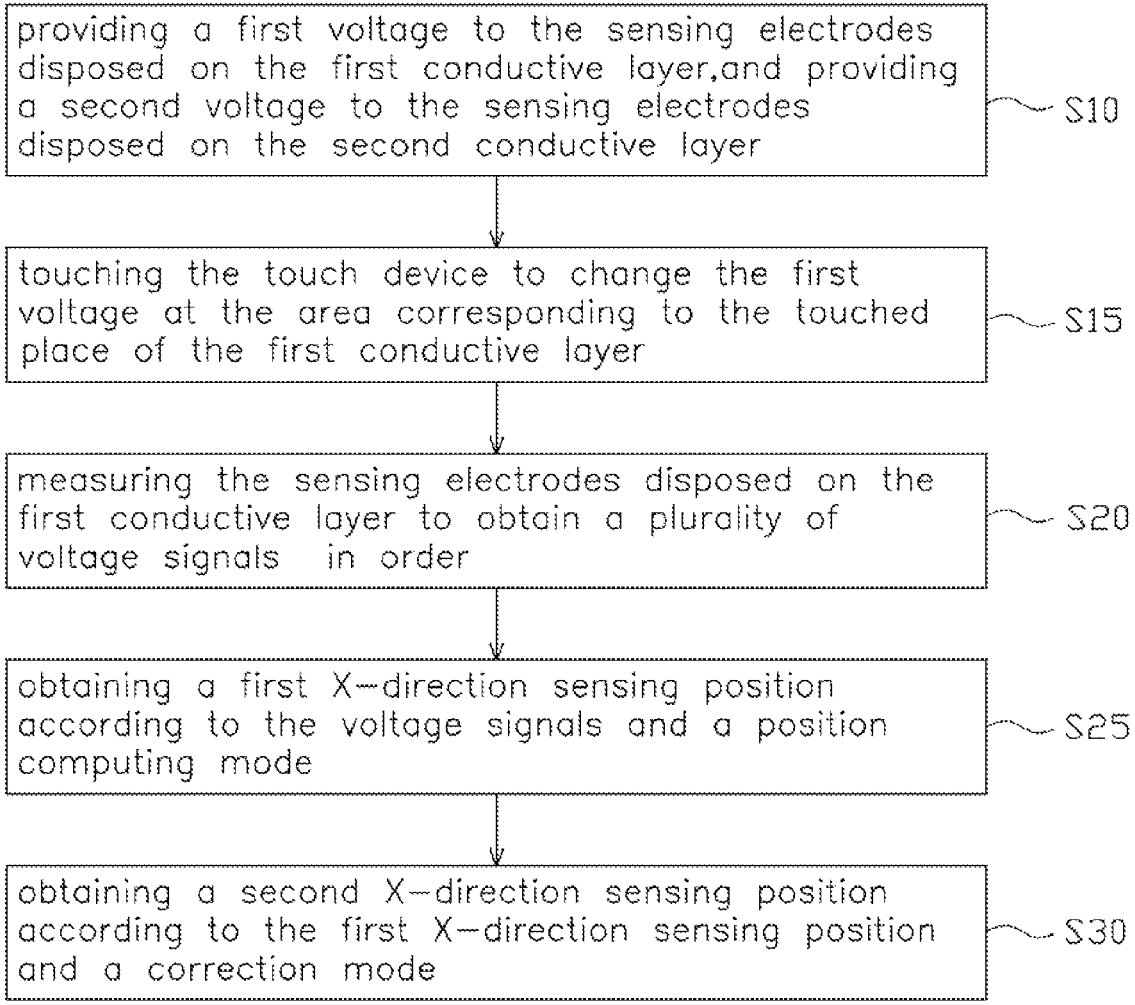
FIG. 4 is a flowchart of a method for detecting a touched position according to an embodiment of the present disclosure.

FIG. 4 is a flowchart of a method for detecting a touched position according to an embodiment of the present disclosure. The embodiment of the present disclosure discloses a method for detecting the touched position on the aforementioned touch device 20. The user touches the touched position of the touch device 20 and the touched position is represented by a XY coordinate plane system. Thus, the current touched position has a X-direction touched position and a Y-direction touched position. The sensing electrodes 34 of the first conductive layer 26 detect the X-direction touched position of the touched position. The sensing electrodes 38 of the second conductive layer 28 detect the Y-direction touched position of the touched position. Below, the method for detecting the X-direction touched position is described as an example. The method for detecting the X-direction touched position includes the following steps.

In step S10, a first voltage, for example 0 volts, is provided to the sensing electrodes 34 disposed on the first conductive layer 26 so that the first conductive layer 26 applies the first voltage. In addition, a second voltage, for example 5 volts, is different from the first voltage and provided to the sensing electrodes 38 disposed on the second conductive layer 28 so that the second conductive layer 28 applies the second voltage.

In step S15, the touch device 20 is touched so that the area of the first conductive layer 26 corresponding to the touched position, i.e. the pressed area, is connected to the area of the second conductive layer 28 corresponding to the touched position, i.e. the area touched by the pressed area of the first conductive layer 26. Consequently, the first voltage at the area of the first conductive layer 26 corresponding to the touched position is changed.

In step 20, a plurality of voltage signals is obtained by measuring the sensing electrodes 34 disposed on the first conductive layer 26 in order.

In a step S25, a first X-direction sensing position is obtained according to the voltage signals and a position computing mode. Further details of the further computing mode will be disclosed below.

In step S30, a second X-direction sensing position is obtained according to the first X-direction sensing position and a correction mode, wherein the second X-direction sensing position is equal to the X-direction touched position, and the correction mode has a first curve relation, for example a first waveform curve relation.

The voltage signals includes a extreme value voltage signal, a first voltage signal, and a second voltage signal. It should be understood that the extreme value voltage signal is largest voltage signal among the voltage signals. The sensing electrodes 34 includes a first sensing electrode, a second sensing electrode, and a third sensing electrode. The first voltage signal is obtained from the first sensing electrode. The extreme value voltage signal is obtained from the second sensing electrode. The second voltage signal is obtained from the third sensing electrode. The second sensing electrode is located between the first sensing electrode and the third sensing electrode, and the second sensing electrode is disposed adjacent to the first sensing electrode and the third sensing electrode, respectively. The first sensing electrode, the second sensing electrode and the third sensing electrode are arranged in X-direction.

A space exists between every two adjacent sensing electrodes 34, and a plurality of computation parameters of the position computing mode includes a difference between the extreme value voltage signal and the first voltage signal, a difference between the extreme value voltage signal and the second voltage signal, and the space. The position computing mode includes three equations, and the equations are described hereinafter.

$$\Delta 1 > \Delta 2 \Rightarrow \Delta S = 0.5 P_X \times \frac{\Delta 1 - \Delta 2}{\Delta 1}$$

$$\Delta 1 = \Delta 2 \Rightarrow \Delta S = 0$$

$$\Delta 1 < \Delta 2 \Rightarrow \Delta S = 0.5 P_X \times \frac{\Delta 1 - \Delta 2}{\Delta 2}$$

where 1 represents a difference subtracted the first voltage signal from the extreme value voltage signal, 2 represents a difference subtracted the second voltage signal from the extreme value voltage signal, Px represents a space, and S represents a difference subtracted the X-direction position of the second sensing electrode from the first X-direction sensing position.

Figure 5:
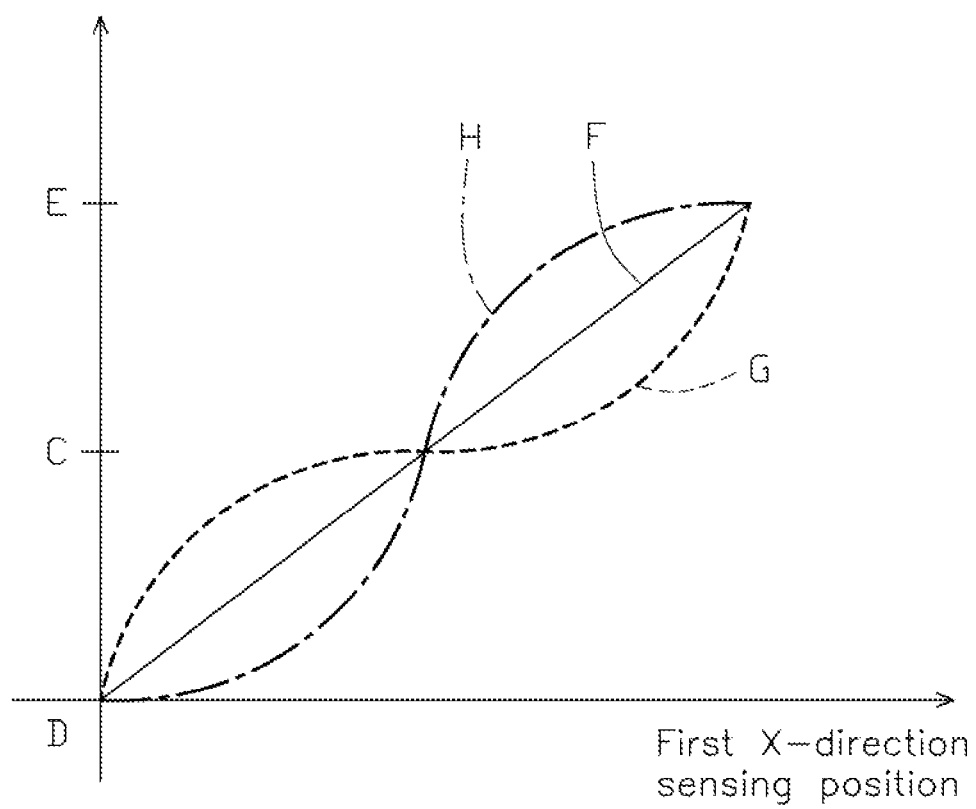
FIG. 5 is a schematic view illustrating a coordinate of a first X-direction sensing position and a X-direction touched position.

It should be understood that error values exist between the calculated first X-direction sensing position according to the above-mentioned position computing mode and the real X-direction touched position. FIG. 5 is a schematic view illustrating a coordinate of a first X-direction sensing position and a X-direction touched position. Referring to FIG. 5, the coordinate is obtained by calculating a plurality of X-direction touched position and a plurality of the first X-direction sensing position in a region between the position C of the second sensing electrode located in X-direction adding 0.5Px(E point) and the position C of the second sensing electrode located in X-direction subtracting 0.5Px(D point). Herein, the horizontal axis represents the first X-direction sensing position, and the vertical axis represents the X-direction touched position. A second waveform curve relation G exists between the first X-direction sensing position obtained by the position computing mode and the X-direction touched position as shown in FIG. 5., and the second waveform curve relation G does not display the straight line F which has a slope of 1. In other words, the first X-direction sensing position is not equal to the X-direction touched position, and a difference exists between them. Therefore, it is necessary to perform the correction mode in step S30 again. The first waveform curve relation of the correction mode represents H, and the second waveform curve relation G and the first waveform curve relation H are inverted. The first waveform curve relation H and the second waveform curve relation G use the X-direction position C of the second sensing electrode as a inflection point.

The correction mode has a correction established according to the first X-direction sensing position and the X-direction touched position, for example, as referring to the first waveform curve relation H. A second X-direction sensing position is obtained by correcting the first X-direction sensing position according to the first waveform curve relation H. The second X-direction sensing position is equal to the X-direction touched position of the current touched position so as to position the X-direction touched position of the touched position. Alternatively, the correction mode includes a compensation table, and the data of the compensation table displays the first waveform curve relation H. The data of the compensation table is composed of each difference obtained by each X-direction touched position subtracting each corresponding first X-direction sensing position, and the X-direction touched position and the corresponding first X-direction sensing position in the region of the position C±0.5Px(D point and E point) located in X-direction of the second sensing electrode. Therefore, a second X-direction sensing position is obtained by searching the compensation table to obtain a compensation difference of the first X-direction sensing position and then adding up the first X-direction sensing position and the compensation difference. The second X-direction sensing position is equal to the current X-direction touched position of the touched position, so as to position the X-direction touched position of the touched position.

The above-mentioned method for detecting the X-direction touched position is applied to the current touched position located in the non-boundary region 44 of the first conductive layer 26. If the current touched position is located in any one boundary region 42 of the first conductive layer 26, the second voltage signal is subjected to voltage adjustment by the following voltage adjusting mode and then substituted into the position computing mode rather than directly substituting into the position computing mode like the described above. Below, the touched position located in the boundary region 42 (also referred to as a first boundary region 42 in the following) at the upper right side of the first conductive layer 26 is described as an example. Similarly, the touched position located in the other boundary region 42 can be deduced, and thus the details will not be described herein.

If the touched position is located in the first boundary region 42 of the first conductive layer 26, the X-direction touched position is located between the first line A and the second lines B of the first conductive layer 26, and the third sensing electrode is closest to the second side 40 of the first conductive layer 26 among the sensing electrodes. The voltage adjusting mode has a correction established according to the first voltage, a third voltage signal, and a fourth voltage signal. The method for obtaining the third voltage signal and the fourth voltage signal is described in detail below. When the first voltage of a center line 50 is changed by touching the center line 50 of the first conductive layer 26, the third voltage signal is obtained from the third sensing electrode, the fourth voltage signal is obtained form the second sensing electrode, the center line 50 is located at the center between the first line A and the third line J, and the third line J extends from the second sensing electrode and is parallel to the second side 40. The distance between the position of which the first voltage of the center line 50 is changed and the first side 32 is equal to the distance between the touched position and the first side 32.

The voltage adjusting mode can be represented by a following equation. The equation is:

$$V4 = Vr - (Vr - V3) \times (Vr - V2)/(Vr - V1),$$

where V1 represents the third voltage signal, V2 represents the fourth voltage signal, V3 represents the second voltage signal, V4 represents the corrected voltage signal and Vr represents the first voltage.

Hence, when the current X-direction touched position locates in the first boundary region 42 of the first conductive layer 42, the second voltage signal obtained from the third sensing electrode should be adjusted by the voltage adjusting mode to obtain the corrected voltage signal and then substituted the first voltage signal, the extreme value voltage signal, and the corrected voltage signal into the position computing mode to obtain a first X-direction sensing position. At this time, the 2 in the three equations of the position computing mode is a difference that extreme value voltage signal subtracting the corrected voltage signal. Next, a second X-direction sensing position is obtained by performing the above-mentioned step S30. Herein, the second X-direction sensing position is equal to the X-direction touched position located in the first boundary regions 42.

The operating theory of the method for detecting Y-direction touched position is similar to that of the X-direction touched position. The difference is that the direction is different. When the user touches the touch device 20 and the first conductive layer 26 and the second conductive layer 28 are connected to each other, the voltage at the area of the first conductive layer 26 corresponding to the touched position is raised, and the voltage at the area of the second conductive layer 28 corresponding to the touched position is decreased. Hence, the extreme value voltage signal is a smallest in the voltage signals by applying the method for detecting Y-direction touched position. The method for detecting the Y-direction touched position can be known from the method for detecting the X-direction touched position disclosed above except for the above-described difference, and it will not be described in detail herein.

Accordingly, in the method for detecting the X-direction touched position of the present disclosure, the first X-direction sensing position is generated by the position computing mode in advance, and then the second X-direction sensing position is generated by adjusting the first X-direction sensing position according to the correction mode. At this time, the second X-direction sensing position is equal to the X-direction touched position. Hence, the X value of the touched position is positioned. Similarly, it also uses a method for detecting Y-direction touched position to position the Y value of the touched position. As a result, the position of the touched position is detected and the error problem is solved.

It will be apparent to those skilled in the art that various modifications and variations can be made to the present disclosure without departing from the scope or spirit of the disclosure. In view of the foregoing, it is intended that the present disclosure cover modifications and variations of this disclosure provided they fall within the scope of the following claims and their equivalents. Any of the embodiments or any of the claims of the disclosure does not need to achieve all of the advantages or features disclosed by the present disclosure. Moreover, the abstract and the headings are merely used to aid in searches of patent files and are not intended to limit the scope of the claims of the present disclosure.

What is claimed is:

1. A method for detecting a touched position on a touch device, the touch device having a first conductive layer and a plurality of sensing electrodes being separated from each other, and disposed on one side of the first conductive layer, the method for detecting the touched position comprising:
providing a first voltage to the first conductive layer;
receiving a touch signal in response to a touched position of the touch device to change the first voltage at an area of the first conductive layer, wherein the area corresponds to the touched position;
measuring the sensing electrodes detecting the variation of the first voltage to obtain a plurality of voltage signals, wherein the voltage signals comprises an extreme value voltage signal, a first voltage signal, and a second voltage signal, the sensing electrodes comprises a first sensing electrode, a second sensing electrode, and a third sensing electrode, the first voltage signal is obtained from the first sensing electrode, the extreme value voltage signal is obtained from the second sensing electrode, the second voltage signal is obtained from the third sensing electrode, the second sensing electrode is located between the first sensing electrode and the third sensing electrode, and the second sensing electrode is disposed adjacent to the first sensing electrode and the third sensing electrode, respectively;
obtaining a first sensing position according to the voltage signals and a position computing mode; and
obtaining a second sensing position according to the first sensing position and a correction mode, wherein the second sensing position is equal to the touched position, and the correction mode has a first curve relation;
wherein a space exists between every two adjacent sensing electrodes, a plurality of computation parameters of the position computing mode comprises a difference between the extreme value voltage signal and the first voltage signal, a difference between the extreme value voltage signal and the second voltage signal, and the space.

2. The method for detecting the touched position on the touch device as claimed in claim 1, wherein the first curve relation of the correction mode is a first waveform curve relation.

3. The method for detecting the touched position on the touch device as claimed in claim 2, wherein a second waveform curve relation exists between the first sensing position obtained by the position computing mode and the touched position, and the second waveform curve relation and the first waveform curve relation are inverted.

4. The method for detecting the touched position on the touch device as claimed in claim 2, wherein the correction mode comprises a compensation table, and the data of the compensation table displays the first waveform curve relation.

5. The method for detecting the touched position on the touch device as claimed in claim 4, wherein the data of the compensation table has a difference between the touched position and the first sensing position.

6. The method for detecting the touched position on the touch device as claimed in claim 1, wherein the first waveform curve relation uses the position of the second sensing electrode as a inflection point.

7. The method for detecting the touched position on the touch device as claimed in claim 1, wherein the first conductive layer has impedance anisotropic properties.

8. The method for detecting the touched position on the touch device as claimed in claim 7, wherein the touch device further has a second conductive layer, and the second conductive layer and the first conductive layer are stacked together, the method for detecting the touched position further comprises providing a second voltage to the second conductive layer, the second voltage is different from the first voltage, wherein in the step of touching the touch device, the first voltage is changed by connecting the area of the first conductive layer corresponding to the touched position and the area of the second conductive layer corresponding to the touched position.

9. A method for detecting a touched position on a touch device, the touch device having a first conductive layer and a plurality of sensing electrodes being separated from each other, and disposed on a first side of the first conductive layer, the method for detecting the touched position comprising:
providing a first voltage to the first conductive layer;
receiving a touch signal in response to a touched position of the touch device to change the first voltage at an area of the first conductive layer, wherein the area corresponds to the touched position;
measuring the sensing electrodes detecting the variation of the first voltage to obtain a plurality of voltage signals, wherein the voltage signals comprises an extreme value voltage signal, a first voltage signal, and a second voltage signal, the sensing electrodes comprises a first sensing electrode, a second sensing electrode, and a third sensing electrode, the first voltage signal is obtained from the first sensing electrode, the extreme value voltage signal is obtained from the second sensing electrode, the second voltage signal is obtained from the third sensing electrode, the second sensing electrode is located between the first sensing electrode and the third sensing electrode, and the second sensing electrode is disposed adjacent to the first sensing electrode and the third sensing electrode, respectively;
adjusting the second voltage signal according to a voltage adjusting mode to obtain a corrected voltage signal;
obtaining a first sensing position according to the first voltage signals, the extreme value voltage signal, the corrected voltage signal, and a position computing mode; and
obtaining a second sensing position according to the first sensing position and a correction mode, wherein the second sensing position is equal to the touched position, and the correction mode has a first curve relation.

10. The method for detecting the touched position on the touch device as claimed in claim 9, wherein the third sensing electrode is closest to a second side perpendicular to the first side of the first conductive layer in the sensing electrodes and the touched position is located between a first line and a second line, the first line extends from the third sensing electrode and is parallel to the second side, and the second line extends from the center between the second sensing electrode and the first sensing electrode and is parallel to the second side.

11. The method for detecting the touched position on the touch device as claimed in claim 10, wherein the touch device further has a second conductive layer and a plurality of sensing electrodes disposed on one side of the second conductive layer, the second conductive layer and the first conductive layer are stacked together, and the second side of the first conductive layer is disposed adjacent to the side of the second conductive layer.

12. The method for detecting the touched position on the touch device as claimed in claim 10, wherein the voltage adjusting mode has a connection established according to the first voltage, a third voltage signal, and a fourth voltage signal, when the first voltage of a center line is changed by touching the center line of the first conductive layer, the third voltage signal is obtained from the third sensing electrode, the fourth voltage signal is obtained from the second sensing electrode, the center line is located at the center between the first line and the third line, and the third line extends from the second sensing electrode and is parallel to the second side.

13. The method for detecting the touched position on the touch device as claimed in claim 12, wherein the voltage adjusting mode comprises a equation, and the equation is: $V4=Vr-(Vr-V3)\times(Vr-V2)/(Vr-V1)$, wherein V1 represents the third voltage signal, V2 represents the fourth voltage signal, V3 represents the second voltage signal, V4 represents the corrected voltage signal, and Vr represents the first voltage.

14. The method for detecting the touched position on the touch device as claimed in claim 12, wherein a distance between a position of which the first voltage of the center line is changed and the first side is equal to a distance between the touched position and the first side.

15. The method for detecting the touched position on the touch device as claimed in claim 9, wherein a space exists between every two adjacent sensing electrodes, a plurality of computation parameters of the position computing mode comprises a difference between the extreme value voltage signal and the first voltage signal, a difference between the extreme value voltage signal and the corrected voltage signal, and the space.

16. The method for detecting the touched position on the touch device as claimed in claim 9, wherein the first curve relation of the correction mode is a first waveform curve relation.

17. The method for detecting the touched position on the touch device as claimed in claim 16, wherein the first waveform curve relation uses the position of the second sensing electrode as a inflection point.

18. The method for detecting the touched position on the touch device as claimed in claim 16, wherein the correction mode comprises a compensation table, and the data of the compensation table displays the first waveform curve relation.

19. The method for detecting the touched position on the touch device as claimed in claim 18, wherein the data of the compensation table has a difference between the touched position and the first sensing position.

20. The method for detecting the touched position on the touch device as claimed in claim 9, wherein the first conductive layer has impedance anisotropic properties.

* * * * *